Oct. 29, 1940.  H. J. McC. BURDICK  2,219,761
VALVE
Filed Aug. 6, 1938  2 Sheets-Sheet 2
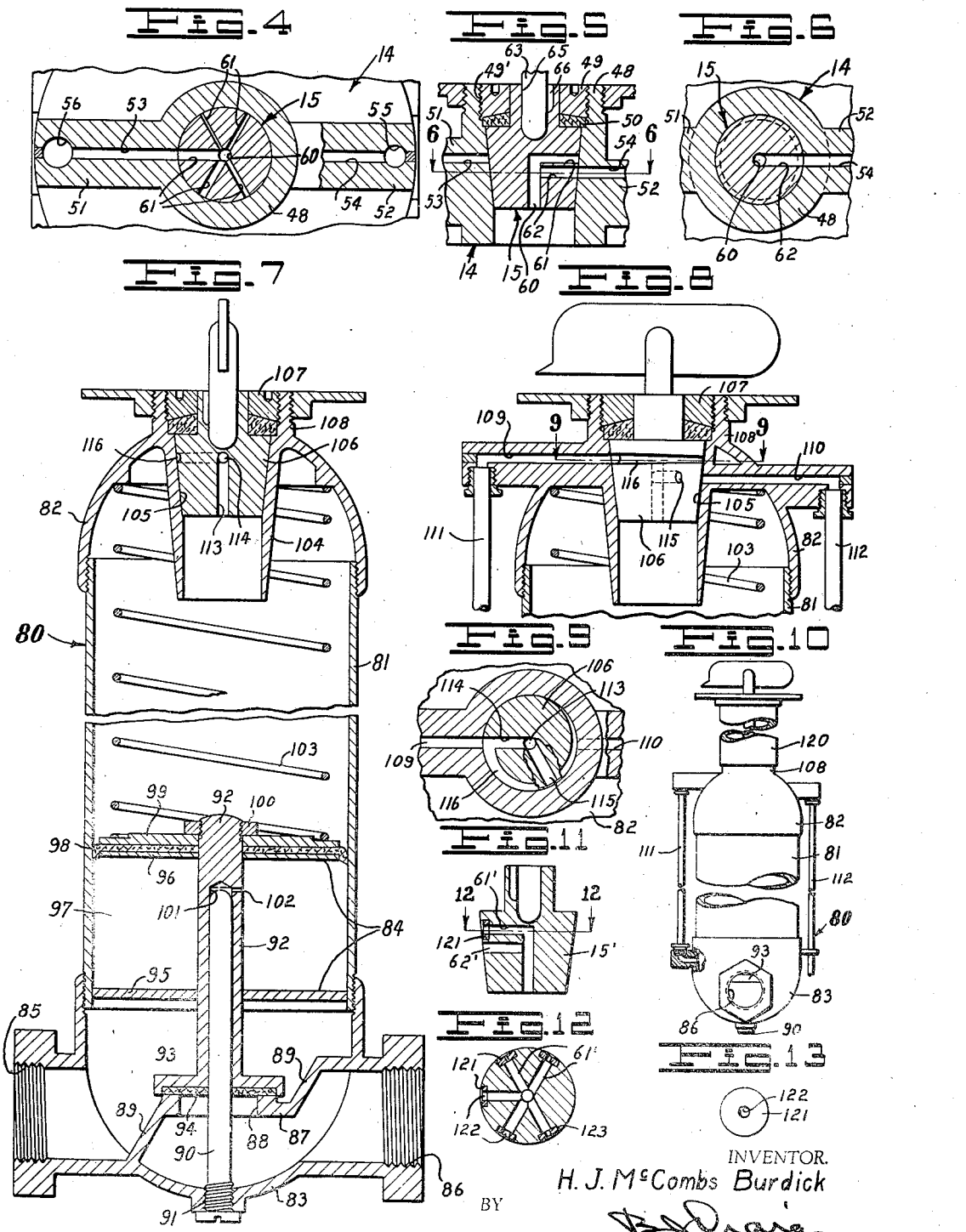
INVENTOR.
H. J. McCombs Burdick
BY
ATTORNEY.

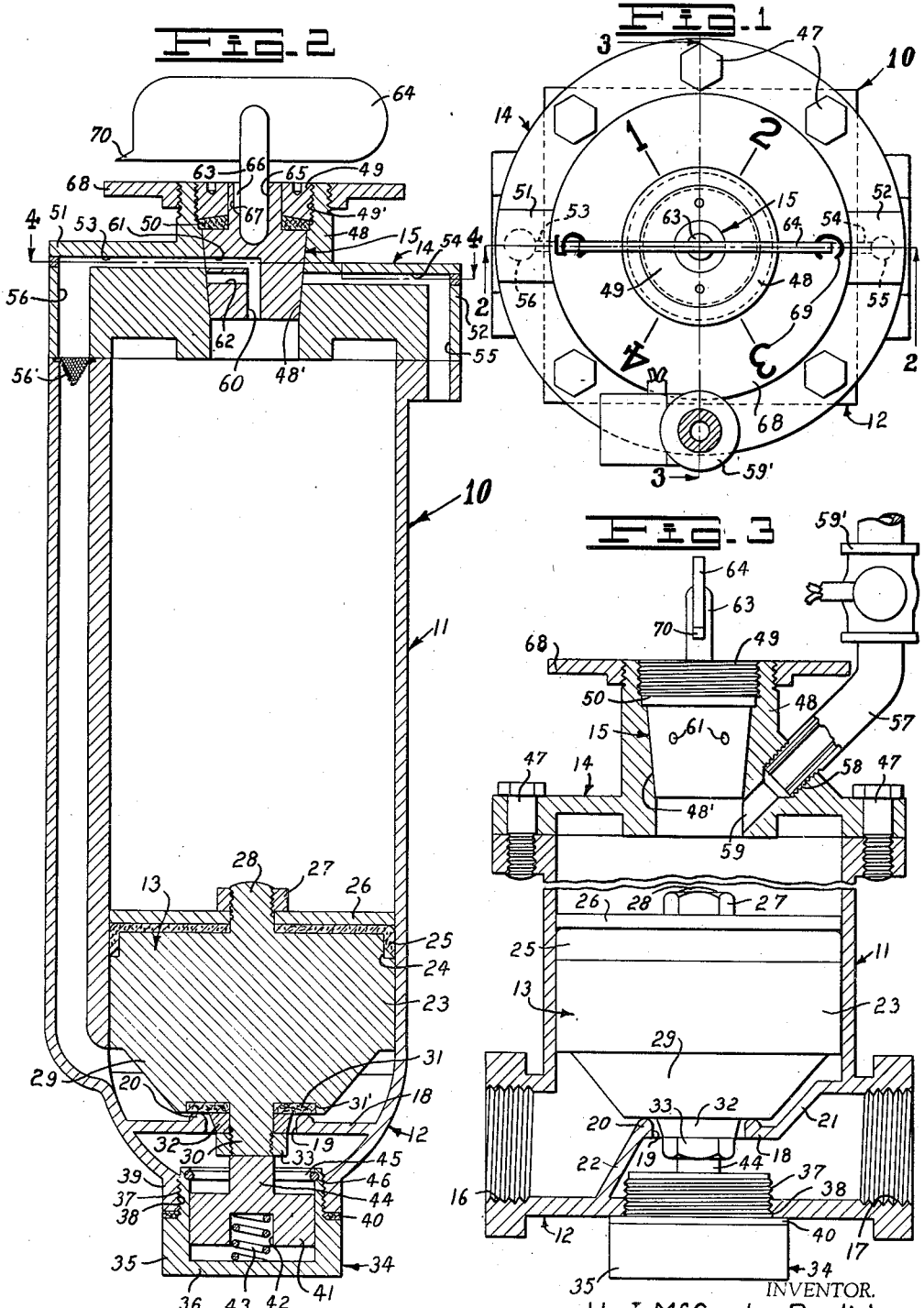

Patented Oct. 29, 1940

2,219,761

UNITED STATES PATENT OFFICE 2,219,761

VALVE

Harry J. McCombs Burdick, Anaheim, Calif.

Application August 6, 1938, Serial No. 223,480

3 Claims. (Cl. 137—139)

This invention relates to improvements in fluid control devices.

The general object of the invention is to provide a novel time controlled valve adapted to control automatically the flow of a fluid.

Another object of the invention is to provide a novel adjustable time controlled valve which will stop the flow of fluid after a predetermined length of time.

Another object of the invention is to provide a valve having an actuating cylinder and piston with novel means for controlling the movement of the piston within the cylinder.

Another object of the invention is to provide a novel control member for a time valve.

Other objects and advantages of my invention will be apparent from the following description taken in connection with the accompanying drawings, wherein:

Fig. 1 is a top plan view of my improved valve;

Fig. 2 is a section taken on line 2—2 Fig. 1;

Fig. 3 is a fragmentary section taken on line 3—3 Fig. 1;

Fig. 4 is a fragmentary section taken on line 4—4 Fig. 2;

Fig. 5 is a fragmentary section showing the parts in another position;

Fig. 6 is a fragmentary section taken on line 6—6 Fig. 5;

Fig. 7 is a central sectional view of a modification of my valve;

Fig. 8 is a fragmentary, central section of the valve shown in Fig. 7 rotated through 90°;

Fig. 9 is a fragmentary section taken on line 9—9 Fig. 8 with parts broken away;

Fig. 10 is a side elevation of the modification shown with an extension on the upper end and with parts broken away;

Fig. 11 is a central section of a modified plug;

Fig. 12 is a section taken on line 12—12 Fig. 11; and

Fig. 13 is an enlarged view of a metering disk.

Referring to the drawings by reference characters I have shown my invention as embodied in a time controlled valve device which is indicated generally at 10.

As shown the device 10 includes a hollow cylindrical body portion 11 having an integral cylindrical bottom portion 12 the axis of which is substantially perpendicular to the axis of the body portion. The device 10 further includes a piston 13 slidable within the hollow body portion 11, and a cap portion 14 including a manually operated plug valve 15.

The bottom portion 12 has a fluid inlet aperture 16 and an outlet aperture 17, both these apertures being adapted to be connected to a pipe line. A wall 18 having an aperture 19 with a raised rim 20 is disposed within the bottom portion 12, diagonal walls 21 and 22 being connected thereto as shown in Fig. 3.

The piston 13 includes a main body 23 with a reduced upper portion 24 which accommodates a packing cup 25 secured by a plate 26 which is in turn secured by a nut 27 engaging a threaded boss 28 on the body 23. The body 23 has a lower tapered portion 29 terminating in a depending threaded boss 30. A packing ring 31 adapted to engage the raised rim 20 of the aperture 19 is disposed around the boss 30 in a groove 31' in the body 23 being secured therein by a tapered collar 32 and a nut 33. It will be seen that when the ring 31 engages the rim 20 passage from the inlet aperture 16 to the outlet aperture 17 is prevented.

A dash-pot assembly 34 is shown located below the aperture 19 and includes a hollow cylinder 35 with a closed lower end 36 and an upper reduced threaded portion 37 engaging an aperture 38 in a depending hub 39 on the bottom 12, packing 40 being disposed therebetween. A piston 41 is disposed within the cylinder 35 and has a lower central recess 42 accommodating a spring 43 and an upper boss 44 adapted to engage the lower end of the boss 30 on the piston 13. A snap ring 45 engaging a groove 46 within the cylinder 35 limits the travel of the piston 41.

The cap 14 is secured to the body portion 11 by cap screws 47 and includes an upstanding hub 48 having a tapered bore 48' engaged by the plug valve 15 which is held therein by a retaining collar 49 engaging a threaded portion 49' of the bore 48' packing 50 being disposed between the collar and the valve. A pair of opposed radial arms 51 and 52 are disposed on the top face of the cap 14 and have conduits 53 and 54 therein respectively.

The conduit 54 communicates with a vertical conduit 55 opening to the atmosphere while the conduit 53 communicates with a vertical conduit 56 and may include a screen 56' which leads from the lower portion of the hollow cylindrical body portion 11. As shown in Fig. 1 the conduit 54 is on a somewhat lower level than the conduit 53. A conduit 57 (Fig. 3) threadedly engages an aperture 58 communicating with the interior of the valve device 10 as at 59. The conduit 57 may be closed by a suitable valve 59' such as a solenoid operated valve.

The plug valve 15 has an axial conduit 60 opening through the underface thereof and at its upper end communicating with a plurality of radial coplanar conduits 61 on the same level as the conduit 53. As shown in Fig. 4 the conduits 61 vary in diameter. A radial conduit 62 communicates with the axial conduit 60 at the level of the conduit 54.

The shank 63 of a removable controller 64 slidably engages an aperture 65 in the plug valve 15, a key 66 integral with the shank engaging a keyway 67. A dial 68 having suitable indicia 69 thereon may be screwed to or otherwise mounted on the hub 48, a pointer 70 on the controller 64 indicating the positions of the various radial conduits in the plug valve 15.

In use the device 10 is connected in a pipe line, as for instance, a sprinkler system, it being desirable to operate the sprinklers for a certain predetermined period of time. The plug valve 15 is rotated so that the radial conduit 62 communicates with the conduit 54 thus affording free passage between the interior of the body portion 11 and the atmosphere. The fluid entering the inlet aperture 16 urges the piston 13 upwardly discharging fluid in the upper part of the hollow body portion 11 via the conduits 60, 54 and 55 and filling the chamber below the piston 13. This operation opens the aperture 19 allowing free passage of fluid through the outlet aperture 17. The plug valve 15 is then rotated so that one of the radial conduits 61 communicates with the conduit 53.

Fluid will now flow up the conduit 56 and slowly discharge into the hollow body portion 11 above the piston 13 via the conduits 53, 61 and 60, and allow the piston 13 to drop until the aperture 19 is again closed stopping the fluid flow. Near the end of the downward stroke the flow is slowly decreased by the action of the tapered sleeve 32, while the final movement of the piston is retarded by the action of the dash-pot 34. This slow checking of the fluid flow is desirable to eliminate the dangers of a "water hammer" effect.

If it is desired to control the valve device 10 remotely the preliminary discharge of the fluid above the piston may be effected by opening the solenoid operated valve (not shown) on the conduit 57 by closing a switch in the solenoid circuit. This may be done manually or by a suitable clock device. It will be understood that the capacity of the conduits 57 and 59 must exceed the capacity of the largest conduit 61 in order to fully raise the piston 13.

In Figs. 7, 8, 9 and 10 I have shown a modification of my valve device which I have indicated generally at 80. As shown the valve device 80 includes a hollow cylindrical body portion 81 threadedly engaging an upper cap 82 and a lower cap 83. The device 80 further includes a hollow piston 84 slidable within the body portion 81.

The lower cap 83 has an inlet aperture 85 and an outlet aperture 86 and is provided with a wall 87 with an aperture 88 therein, diagonal walls 89 being disposed as shown in Fig. 7. A rod 90 is rigidly connected to the cap 83 as at 91 and extends upwardly through the aperture 88.

The piston 84 includes a central cored member 92 with an enlarged lower portion 93 having a recess in the under face thereof containing a packing ring 94 engageable to close the aperture 88. A lower plate 95 and upper plate 96 are secured to the core member 92 as by welding, the two plates forming a chamber 97. The upper plate 96 carries a packing cup 98 secured by a plate 99 and a nut 100. The core member 92 is provided with a central bore 101 slidable on the rod 90 and having a radial aperture 102 at its upper end communicating with the chamber 97. A spring 103 normally urges the piston 84 downwardly.

The upper cap 82 includes an inwardly depending hub 104 having a bore 105 the upper end of which is tapered and engaged by a manually operated plug valve 106 held therein by a retaining ring 107 threadedly engaging the bore of an upstanding hub 108 coaxial with the hub 104. Radial conduits 109 and 110 communicate at their inner ends with the tapered bore 105 and at their outer ends with vertical conduits 111 and 112 respectively, the conduit 112 communicating with the atmosphere and the conduit 111 communicating with the lower part of the hollow body portion 81 below the piston 84 as shown in Fig. 10. The conduit 110 is at a somewhat lower level than the conduit 109.

The plug valve 106 has an axial conduit 113 which at its upper end connects with a radial conduit 114 at the level of the conduit 109, and a radial conduit 115 at the level of the conduit 110. A peripheral groove 116, tapered in both width and depth as shown in Figs. 8 and 9 is provided on the plug valve 106 at the level of the conduit 109.

The device 80 is actuated in a manner similar to that described for the device 10, the piston 84 being first carried upwardly opening the aperture 88 and then is urged slowly downwardly by the spring 103 fluid entering above the piston via the conduits 111, 109, 113 and the groove 116. It will be seen that the tapered groove 116 provides means for adjusting the flow of fluid and consequently the timing of the valve. The piston is retarded towards the end of the stroke by the action of the rod 90 forcing fluid from the bore 101 through the aperture 102 into the interior of the piston 84.

In Fig. 10 I have shown a tubular extension 120 on the device 80, at its lower end engaging the hub 108, so that the device 80 may be placed conveniently below the surface of the ground but leaving the operating parts exposed.

In Figs. 11, 12 and 13 I have shown an improved plug valve 15' which may be employed in place of the plug 15 and wherein the radial conduits 61' are all the same size, metering disks 121 having central apertures 122 of various sizes being pressed into enlarged portions 123 of the conduits 61'. The plug 15' includes a conduit 62' which functions as does the conduit 62.

From the foregoing description it will be apparent that I have invented a novel fluid control device which is highly efficient for the intended purpose.

Having thus described my invention, I claim:

1. In a fluid control device, a hollow cylindrical body portion having a valve member on one end thereof, said valve member including an inlet and an outlet with a valve seat therebetween, a piston construction in said cylinder including a pair of spaced disks, packing means on one of said disks, a hollow rod holding said disks in spaced relation, said rod having a valve on the lower end thereof adapted to engage said valve seat to close passage therethrough, a stem on said valve member and projecting through said valve seat, said stem being movable into said rod, said rod having an aperture therein affording communication from the interior to the exterior thereof, a cap on said cylinder, a spring engaging said cap and said piston to normally urge the piston downwardly, said cap having an internally extending boss thereon, said boss having a tapered cavity therein, means to afford communication between the valve member and said tapered cavity, a plug rotatable in said tapered cavity, said plug having an axial conduit extending from one end thereof, said plug having a peripheral conduit in the outer surface thereof, said peripheral conduit being of increasing cross section towards one end, said plug including a radial conduit affording communication between said peripheral conduit and said axial conduit, a second radial conduit in said plug below said first radial conduit, said second mentioned radial conduit communicating with said axial conduit, said cap having a bleed conduit therein, said second radial conduit communicating with said bleed conduit, said peripheral conduit being coplanar with the discharge end of the means for affording communication between the tapered aperture and the valve member and means to rotate said tapered plug.

2. In a fluid control device, a hollow cylindrical body portion having a valve member on one end thereof, said valve member including an inlet and an outlet with a valve seat therebetween, a piston in said cylinder including a hollow rod on said piston, said rod having a valve on the lower end thereof adapted to engage said valve seat, a stem projecting through said valve seat, said stem being movable into said rod, said rod having an aperture therein, a closure on said cylinder, means to normally urge the piston downwardly, an internally extending boss on said closure, said boss having a tapered cavity therein, means to afford communication between the valve member and said tapered cavity, a plug rotatable in said tapered cavity, said plug having a conduit extending from one end thereof, said plug having a peripheral conduit in the outer surface thereof, said plug including a lateral conduit affording communication between said peripheral conduit and said first mentioned conduit, a second lateral conduit in said plug below said first lateral conduit, said second mentioned lateral conduit communicating with said first mentioned conduit, said closure having a bleed conduit therein, said second lateral conduit communicating with said bleed conduit, said peripheral conduit intersecting the discharge end of the means for affording communication between the tapered aperture and the valve member and means to rotate said tapered plug.

3. In a fluid control device, a hollow cylindrical body portion having a valve member thereon, said valve member including an inlet and an outlet with a valve seat therebetween, a piston in said cylinder including a pair of spaced disks, means to hold said disks in spaced relation, said rod having a valve on the lower end thereof adapted to engage said valve seat to close passage therethrough, a stem on said valve member and projecting through said valve seat, said stem being movable into said rod, said rod having an aperture therein affording communication from the interior to the exterior thereof, a spring in said cylinder engaging said piston to normally urge the piston downwardly, said body portion having an internally extending boss thereon, said boss having a tapered cavity therein, means to afford communication between the valve member and said tapered cavity, a plug rotatable in said tapered cavity, said plug having a conduit extending from one end thereof, said plug having a peripheral conduit in the outer surface thereof, said peripheral conduit being of increasing cross section towards one end, said plug including a radial conduit affording communication between said peripheral conduit and said first mentioned conduit, and a second radial conduit in said plug below said first radial conduit, said second mentioned radial conduit communicating with said first mentioned conduit, said body portion having a bleed conduit therein, said second radial conduit communicating with said bleed conduit, said peripheral conduit being coplanar with the discharge end of the means for affording communication between the tapered aperture and the valve member.

HARRY J. McCOMBS BURDICK.